United States Patent

Barr et al.

[11] 4,025,086
[45] May 24, 1977

[54] PUSH BLOCK ASSEMBLY WITH SHEAR LOAD TRANSMITTING MEANS

[75] Inventors: Jack R. Barr; Thomas E. Hrodey; Ralph G. Johnson, all of Decatur, Ill.

[73] Assignee: Caterpillar Tractor Co., Peoria, Ill.

[22] Filed: Nov. 3, 1975

[21] Appl. No.: 627,568

[52] U.S. Cl. .............................................. 280/481
[51] Int. Cl.² .......................................... B60D 3/00
[58] Field of Search ............... 280/481, 477, 479; 37/129

[56] References Cited

UNITED STATES PATENTS

| | | | |
|---|---|---|---|
| 2,986,827 | 6/1961 | Peterson | 280/481 X |
| 3,434,738 | 3/1969 | Campbell | 280/481 X |
| 3,469,861 | 9/1969 | Schexnayder | 280/479 |
| 3,606,388 | 9/1971 | Campbell | 280/477 |
| 3,740,080 | 6/1973 | Kuhl | 280/481 |

*Primary Examiner*—Joseph F. Peters, Jr.
*Assistant Examiner*—R. Schrecengost
*Attorney, Agent, or Firm*—Phillips, Moore, Weissenberger Lempio & Majestic

[57] ABSTRACT

A construction vehicle has a push-pull arrangement mounted on a forward end of the frame thereof. Such arrangement comprises a detachable bail pivotally mounted on the frame and adapted for engagement with a hook of another vehicle and a detachable push block assembly detachably mounted on the frame. A common bore is formed in the frame and push block assembly to mount a like-shaped annular member for transmitting shear loads imposed on the push block assembly to the frame directly.

16 Claims, 3 Drawing Figures

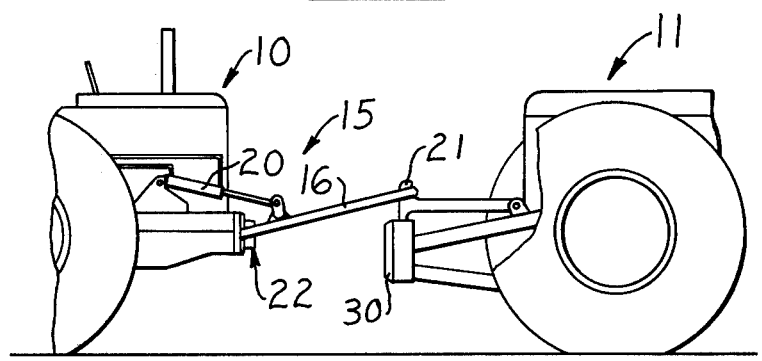
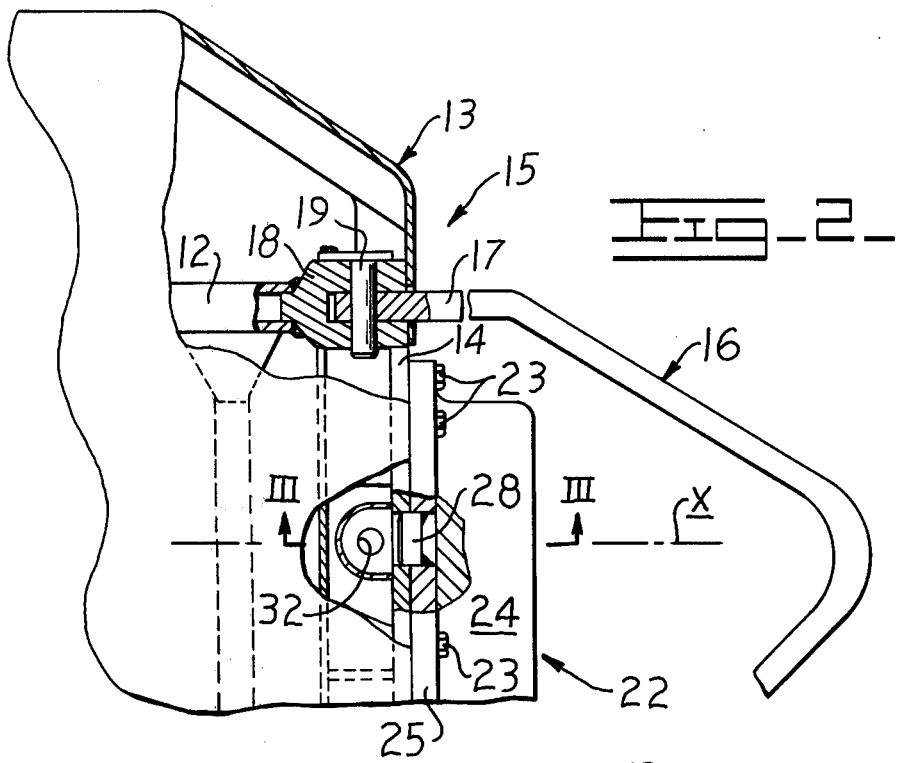
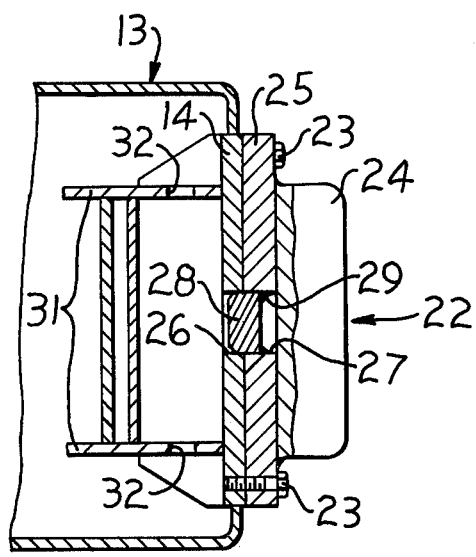

PUSH BLOCK ASSEMBLY WITH SHEAR LOAD TRANSMITTING MEANS

BACKGROUND OF THE INVENTION

This invention relates to a push-pull arrangement, including a push block assembly, of the types illustrated in U.S. Pat. Nos. 3,434,738 and 3,469,861, both assigned to the assignee of this application. Such arrangements each comprise a bail pivotally mounted on the forward end of one vehicle to selectively engage a hook mounted on the rearward end of another vehicle for towing purposes. In addition, a push block is mounted on the forward end of the former vehicle for push loading purposes. This arrangement is particularly useful to increase the versatility and the efficiency of tractor-scrapers (particularly tandem-powered) over a wide range of work tasks.

SUMMARY OF THIS INVENTION

An object of this invention is to provide an improved push block assembly, particularly useful in a push-pull arrangement for a construction vehicle wherein shear loads normally imposed on the push block assembly are transmitted to the frame of the vehicle directly. The push-pull arrangement may comprise a bail movably mounted on the frame and adapted for engagement with a hook of another vehicle for towing purposes and the push block assembly which is detachably mounted on the frame by a plurality of fastening means. Aligned recesses are formed in the frame and push block assembly and a shear load transmitting means, independent of the fastening means, is disposed in the apertures for transmitting such shear loads to the frame.

Another feature of this invention is the utilization of a mounting plate for the push block assembly which forms a common part of the frame and also a bumper assembly of the vehicle. Thus, the vehicle can be operated with the bumper assembly per se, upon detachment of the bail and push block assembly, or in conjunction with one or both of them.

BRIEF DESCRIPTION OF THE DRAWINGS

Other objects of this invention will become apparent from the following description and accompanying drawings wherein:

FIG. 1 is a partical side elevational view of a pair of tractor-scraper (tandem-powered) construction vehicles with the leftward-most vehicle having the push-pull arrangement of this invention mounted thereon;

FIG. 2 is an enlarged and partial top plan view of the push-pull arrangement with portions thereof broken-away for clarification purposes; and FIG. 3. is a sectional view taken in the direction of arrows III-III in FIG. 2.

DETAILED DESCRIPTION

FIG. 1 illustrates portions of a pair of tractor-scraper (tandem-powered) construction vehicles 10 and 11, such as a pair of self-loading wheel tractor scrapers. As shown in FIG. 2, vehicle 10 comprises a main frame structure including a pair of laterally spaced rail members 12 (not shown) having a bumper assembly 13 secured thereto to form an integral part thereof. The frame and bumper assembly include a common flat mounting plate 14 secured laterally between frame members 12.

A push-pull arrangement 15 of this invention comprises a bail 16 having each arm 17 thereof (one shown) pivotally mounted in a yoke 18, secured to a forward end of frame member 12, by a detachable pivot pin 19. An operator controlled double-acting hydraulic cylinder 20 (FIG. 1) is pivotally interconnected between the frame of the vehicle and the bail. Thus the bail can be selectively raised or lowered into locked engagement over a hook 21, secured on a rearward end of vehicle 11.

As more clearly shown in FIG. 3, the push-pull arrangement further comprises a push block assembly 22 detachably mounted on an outboard face of mounting plate 14 by a plurality of fastening means or bolts 23. The push block assembly may comprise a protruding push block 24 welded or otherwise suitably secured to a backing plate 25. Aligned recesses 26 and 27, preferably cylindrical bores covered by member 24, are formed through plates 14 and 25 to accommodate a shear load transmitting means 28 therein.

the shear load transmitting means preferably comprises an annular metallic member or dowel press-fitted into bore 27 and slip-fitted into bore 26. Member 28, disposed on a centrally disposed longitudinal axis X of arrangement 15, may be further secured in place on plate 25 by an annular weld 29. Thus, push block assembly 22, including member 28, can be detached from plate 14 by merely releasing bolts 23.

Annular member 28 thus functions as a shear load transmitting means independent of bolts 23 for transmitting a large portion of shear loads imposed on the push block to plate 14 and thus the frame directly. In particular, when vehicle 10 is utilized to push vehicle 11 over uneven ground, upon raising of bail 16 and engagement of push block 24 with a push block 30 secured on a rearward end of vehicle 11, such shear loads will be imposed on push block assembly 22. As shown in FIG. 3, a pair of vertically spaced brackets 31 are secured to a backside of plate 14 on either side of recesses 26 and 27. A pair of aligned openings 32 are formed through the brackets to adapt them for retention of a draw pin therein.

The above described push-pull arrangement thus increases the overall versatility of the vehicle since: (1) upon removal of pins 19 and bolts 23 to thus remove bail 16 and push block assembly 22 from the vehicle the vehicle may be operated with bumper assembly 13, per se; (2) the bumper assembly can be used only with the push block assembly; (3) the bumper assembly can be used only with the bail; or (4) the bumper assembly can be used with both the push block assembly and the bail

I claim:

1. A push block assembly mounted on a frame of a vehicle, the improvement comprising
   a push block,
   fastening means detachably mounting said push block on said frame,
   means forming aligned recesses in said frame and in said push block, and
   shear load transmitting means, independent of said fastening means, fixedly secured and closely fitted in said recesses for transmitting shear loads imposed on said push block to said frame.
2. The push block assembly of claim 1 further comprising a bail movably mounted on said frame and adapted for engagement with a hook of another vehicle for towing purposes.

3. The push block arrangment of claim 2 wherein said bail comprises a pair of legs each pivotally mounted on said frame by a pivot pin detachably connected to said frame.

4. The push block assembly of claim 3 wherein an end of each of the legs of said bail is pivotally mounted by said pivot pin in a yoke secured to said frame.

5. The push block assembly of claim 1 wherein said frame comprises a mounting plate disposed forwardly thereon and wherein said push block is detachably mounted directly on said plate.

6. The push block assembly of claim 5 wherein said recesses are formed in said plate and in said push block.

7. The push block assembly of claim 6 wherein said push block comprises a backing plate detachably mounted on said mounting plate by said fastening means and a push member secured on said backing plate to cover said recesses.

8. The push block assembly of claim 7 wherein said recesses are formed in said mounting and backing plates.

9. The push block assembly of claim 8 wherein said recesses constitute aligned bores formed through said mounting and backing plates and wherein said shear load transmitting means constitutes an annular member disposed in said bores and further disposed on a centrally disposed longitudinal axis of said push block arrangement.

10. The push block assembly of claim 9 wherein said annular member is secured within the bore formed in said backing plate and is disposed in slip-fit relationship within the bore formed in said mounting plate.

11. The push block assembly of claim 1 further comprising a pair of vertically spaced brackets secured to said frame on either side of said recesses and means defining a pair of aligned openings through said brackets adapted to retain a draw-bar pin therein.

12. A vehicle comprising
a frame including a pair of laterally spaced members and a forwardly disposed mounting plate secured laterally between said members, said plate further forming a portion of a bumper assembly mounted on an end of said vehicle,
a generally U-shaped bail having a pair of legs,
pivot pin means pivotally and detachably mounting each leg of said bail on a respective one of said members,
a push block assembly and
fastening means detachably mounting said push block assembly on said mounting plate.

13. The vehicle of claim 12 wherein an end of each of the legs of said bail is pivotally mounted by said pivot pin means in a yoke secured to said frame.

14. The vehicle of claim 12 wherein said push block assembly comprises a backing plate detachably mounted on said mounting plate by said fastening means and a push block secured on said backing plate.

15. The vehicle of claim 12 further comprising a pair of vertically spaced brackets secured to a backside of said mounting plate and means defining a pair of aligned openings through said brackets adapted to retain a draw-bar pin therein.

16. The vehicle of claim 12 further comprising shear load transmitting means mounted between said mounting plate and said push block assembly for transmitting shear loads imposed on said push block to said frames.

* * * * *